United States Patent
Schulz et al.

(10) Patent No.: US 11,861,541 B2
(45) Date of Patent: Jan. 2, 2024

(54) GRAPHICAL USER INTERFACES FOR FLEXIBLY ORGANIZING AND CONDUCTING A COMPUTER-IMPLEMENTED SIMULATION TO SUPPORT AN EXERCISE

(71) Applicant: Norwich University Applied Research Institutes Ltd, Northfield, VT (US)

(72) Inventors: Michael Schulz, Randolph, VT (US); William McConnell, Prompton Plains, NJ (US); Philip Susmann, Northfield, VT (US)

(73) Assignee: Norwich University Applied Research Institutes Ltd, Northfield, VT (US)

( * ) Notice: Subject to any disclaimer, the term of this patent is extended or adjusted under 35 U.S.C. 154(b) by 0 days.

(21) Appl. No.: 17/566,988

(22) Filed: Dec. 31, 2021

(65) Prior Publication Data
US 2023/0214759 A1 Jul. 6, 2023

(51) Int. Cl.
*G06Q 10/067* (2023.01)
*G06F 3/04847* (2022.01)

(52) U.S. Cl.
CPC ....... *G06Q 10/067* (2013.01); *G06F 3/04847* (2013.01)

(58) Field of Classification Search
CPC .......................... G06Q 10/067; G06F 3/04847
See application file for complete search history.

(56) References Cited

U.S. PATENT DOCUMENTS

| | | |
|---|---|---|
| 2005/0095572 A1 | 5/2005 | Comer et al. |
| 2008/0183520 A1 | 7/2008 | Cutts et al. |

(Continued)

FOREIGN PATENT DOCUMENTS

WO  WO-2014066500 A1 * 5/2014 ........... H04L 41/147

OTHER PUBLICATIONS

Von Praun, Christopher. A Framework for Modelling and Simulating Data Flows in Distributed Computing Systems. Aug. 1998. IEEE Transactions of Nuclear Science. vol. 45. Pages 1951-1957. (Year: 1998).*

(Continued)

*Primary Examiner* — Jennifer N Welch
*Assistant Examiner* — Ashley M Fortino
(74) *Attorney, Agent, or Firm* — Faegre Drinker Biddle & Reath LLP

(57) ABSTRACT

Methods and systems for organizing and conducting a computer-implemented simulation to support an exercise are disclosed. The method includes a processor receiving, via a first GUI prior to the simulation, configuration data representing at least: (a) organizational nodes, (b) organizational pathways, (c) interorganizational relationships, and (d) one or more first events that change the interorganizational relationships. The processor generates a framework of the simulation based on the configuration data, receives user input via a second GUI during a first period of time in the simulation to dynamically change the product flow allocation of the organizational pathways in response to the first events, determines one or more second events based on the user input to dynamically change the interorganizational relationships differently from the first events, and automatically updates the interorganizational relationships of the framework of the simulation in response to applying the second events in a second period of time following the first period of time.

21 Claims, 9 Drawing Sheets

(56) References Cited

U.S. PATENT DOCUMENTS

| | | | | |
|---|---|---|---|---|
| 2012/0149463 | A1* | 6/2012 | Jabara | H04W 76/10 |
| | | | | 463/29 |
| 2013/0151229 | A1* | 6/2013 | Braman | G06Q 40/04 |
| | | | | 703/22 |
| 2016/0092628 | A1 | 3/2016 | Giguere et al. | |
| 2016/0292351 | A1 | 10/2016 | Jacques et al. | |
| 2016/0314224 | A1 | 10/2016 | Wei et al. | |
| 2019/0295011 | A1* | 9/2019 | Shi | G06F 16/254 |
| 2020/0293960 | A1* | 9/2020 | Weaver | G06Q 10/0635 |

OTHER PUBLICATIONS

Hamm, B. Curtis et al.; Developments in Business Simulation & Experiential Exercises; vol. 17; 1990.

Avalias; Avalanche TTX, Avalanche ST, CrowdFlow; from www.avalias.com; Dec. 2021.

Vorttx Training; Online Tabletop Exercises for Healthcare Facilities; from www.vorttx.com; Dec. 2021.

Ares Security; Virtual Tabletop; from www.aressecuritycorp.com/tabletop; Dec. 2021.

National Library of Medicine; Disaster Information Management Research Center (DIMRC) Update; from www.disasterinfo.nlm.nih.gov/virtual-reality; Dec. 2021.

Business Contingency Group; Emergency Response Exercises and Drills; Dec. 2021.

Thorp, Joshua et al.; Santa Fe on Fire: Agent-Based Modeling of Wildfire Evacuation Dynamics; Proceedings of the Agent 2006 Conference on Social Agents: Results and Prospects; Sep. 21-23, 2006.

Nusura; SimulationDeck: the leading internet simulator and exercise management tool; from https://nusura.com/simulationdeck/; Dec. 2021.

VSTEP; Response Simulator Platform; from https://www.vstepsimulation.com/assets/uploads/2021/09/RS-Brochure.pdf?utm_source=Website&utm_medium=Website&utm_campaign=RS+Brochure+Downloads; Dec. 2021.

International Search Report and Written Opinion; International Application No. PCT/US2022/053439; dated May 1, 2023.

* cited by examiner

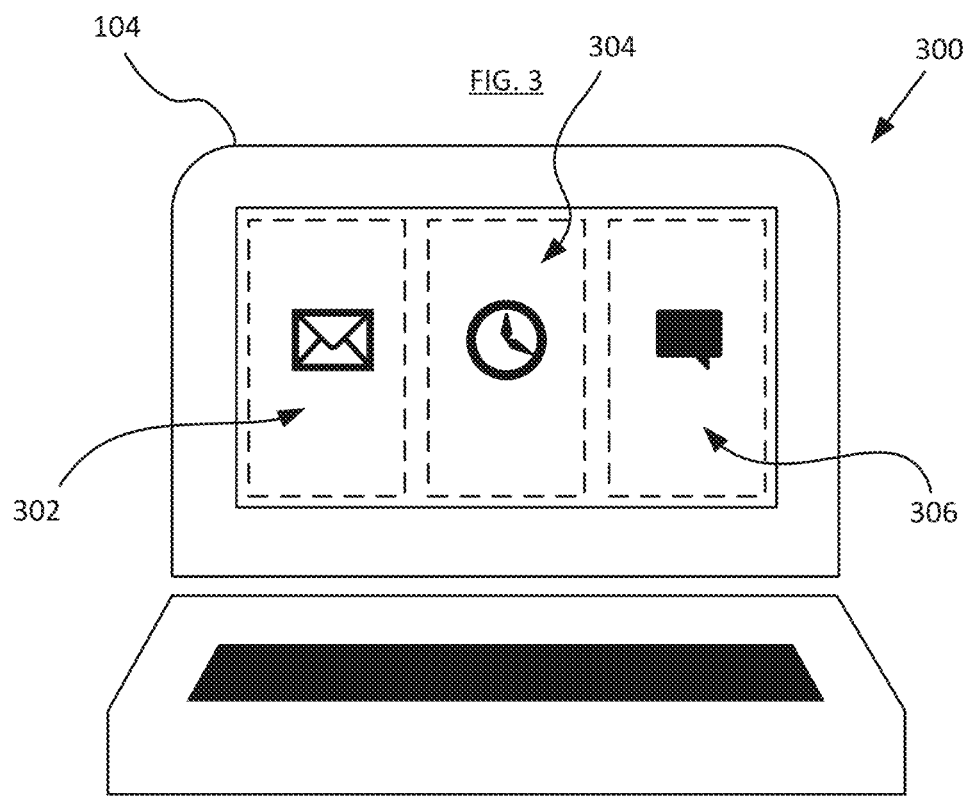
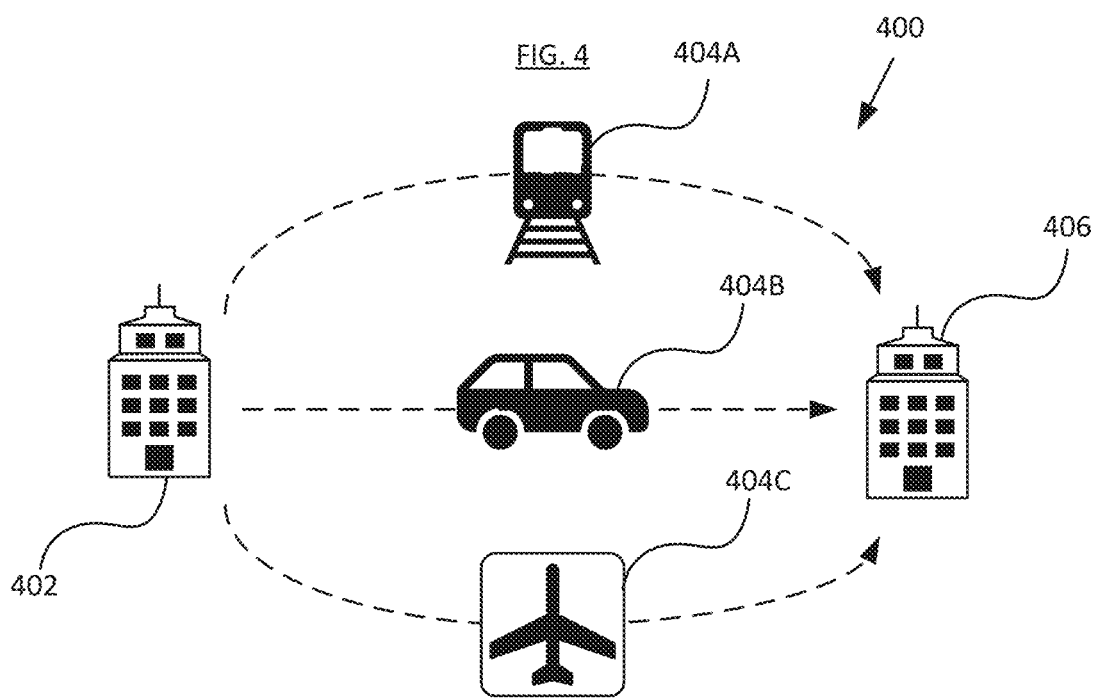

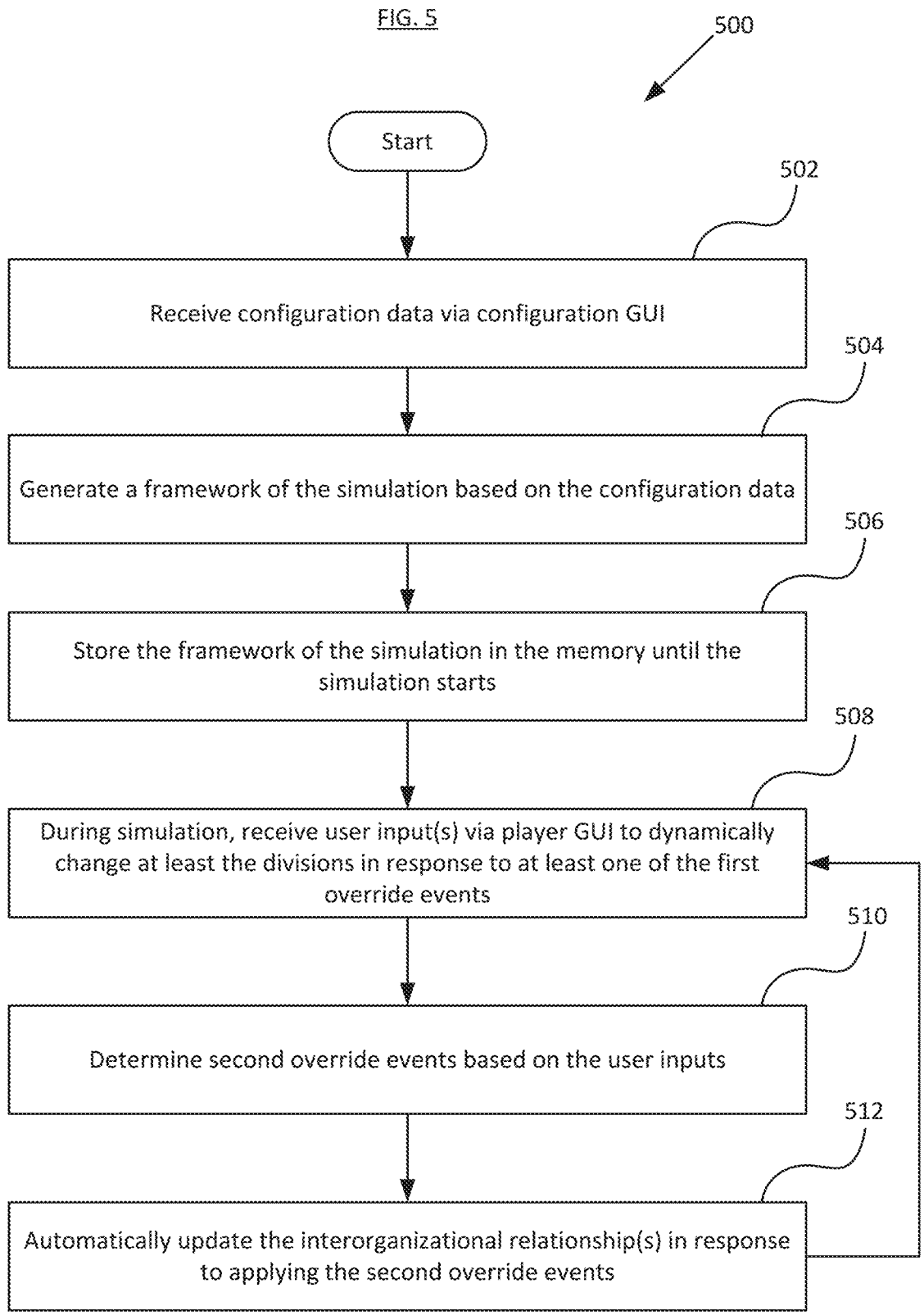

GRAPHICAL USER INTERFACES FOR FLEXIBLY ORGANIZING AND CONDUCTING A COMPUTER-IMPLEMENTED SIMULATION TO SUPPORT AN EXERCISE

FIELD OF THE DISCLOSURE

The present disclosure relates generally to computer-based simulations, and, in particular, to methods and apparatus for representing and simulating the operational impacts of various events on an organization.

BACKGROUND OF THE DISCLOSURE

Business practices have developed to require communication and coordination between operations units from multiple business units that are distributed over a wide area. Computers connected over the internet are an essential element of this process, and this reliance on the internet has opened the door for malicious actors to launch cyberattacks against the computers and databases in order to achieve monetary gain or even for a nation-state to damage the interests of the United States. In response, the government and corporations have taken measures to detect a cyberattack and to maintain continuity of operations (such as product manufacturing and logistics, transportation, monetary interactions, etc.) when under attack. One important method to test the adequacy of these measures and also to ensure that key personnel will be proficient in executing the planned measures is the conduct of simulation exercises that require key personnel to recognize and respond to the business impacts of a wide range of cyberattacks.

Such exercises may be conducted at the level of a single business entity in a single product flow; however, the sector-wide response must also be exercised, because actions of each entity impact the operations of other businesses within the sector, and often the general public as well. Therefore, exercises are preferred to be conducted at a multi-entity scale to simulate the actual real-life problems faced by such entities if such cyberattacks were to take place. However, existing computer-generated simulations of such exercises as known in the art have rigid and specific predefined frameworks which cannot easily be repurposed for different situations or scenarios. For this reason, there is a need for a more flexible method of organizing and implementing such simulations to better accommodate the unique aspects of each organization and system as a whole as well as emulate the complexity of the entire system.

SUMMARY OF THE DISCLOSURE

Various embodiments of the present disclosure relate to methods and systems for organizing and conducting a computer-implemented simulation to support an exercise. The method includes, in some embodiments, at least one processor receiving, via a first graphical user interface (GUI) prior to the simulation, configuration data representing at least the following: (a) organizational nodes, (b) organizational pathways configured to interconnect the organizational nodes, (c) interorganizational relationships of the organizational nodes and the organizational pathways including product flow allocation through each of the organizational pathways, and (d) one or more first events configured to change one or more of the interorganizational relationships at predetermined times during the simulation. The processor then generates a framework of the simulation based on the configuration data. The memory stores the framework of the simulation until the simulation starts. The processor then receives, via a second GUI during a first period of time in the simulation, at least one user input configured to dynamically change the product flow allocation of at least one of the organizational pathways in response to at least one of the first events. The processor determines one or more second events based on the at least one user input, wherein the second events are configured to dynamically change the one or more of the interorganizational relationships differently from the first events and automatically updates one or more of the interorganizational relationships of the framework of the simulation in response to applying the second events in a second period of time following the first period of time.

In some examples, the method includes the processor changing availability of at least one of the organizational nodes and pathways based at least on both the first and second events. In some examples, generating the simulation framework includes flexibly adjusting, by the processor, preexisting interorganizational relationships of a preexisting simulation framework to different interorganizational relationships based on the configuration data. In some examples, generating the simulation framework includes flexibly adjusting, by at least one processor, preexisting organizational nodes and pathways to different preexisting organizational nodes and pathways based on the configuration data.

In some examples, the configuration data represents messages configured to be displayed via the second GUI during the simulation. The processor determines that at least one user input fulfill a condition for at least one of the messages to be displayed and transmits at least one of the messages whose condition is fulfilled by at least one user input to be displayed via the second GUI. In some examples, the method includes the processor assigning a player category to the second GUI and a message category to each of the messages and transmitting the messages to be displayed via the second GUI in response to determining that the player category assigned to the second GUI is the same as the message category assigned to the messages, wherein the at least one user input is received in response to the displayed messages. In some examples, the method includes the processor facilitating communication during the simulation between a plurality of players in a same player category or between different player categories via the second GUI.

In some examples, the method includes the processor receiving, via the first GUI, node capacities of the organizational nodes and pathway capacities of the organizational pathways and changes the node or pathway capacities as determined based on both of the first and second events. In some examples, each of the organizational pathways defines a first directional flow between two of the organizational nodes, and the configuration data further represents counterflow pathways each defining a second directional flow opposing one of the first directional flows. In some examples, the processor changes the preliminary divisions or the second capacities of the organizational pathways during the simulation as determined based on the counterflow pathways.

In some examples, the method includes the processor, prior to the simulation, identifying each of the organizational nodes as one of: a generation node or a destination node of a first flow simulation. The processor then further identifies at least one of the destination nodes of the first flow simulation as a generation node of a second flow simulation. The second flow simulation subsequently follows the first flow simulation. In some examples, the method includes the processor generating instructions which, when executed by a processor of at least one electronic terminal, causes the processor of the at least one electronic terminal to display one of the first GUI or the second GUI, and the processor transmitting the instructions through a telecommunications network to be executed by the processor of the at least one electronic terminal via a web application. In some examples, the exercise is a simulated cyberattack on a flow network comprising the organizational nodes and pathways.

According to some embodiments, a computing device for organizing and conducting a computer-implemented simulation to support an exercise includes the following: at least one processor and a non-transitory computer-readable medium. The computer-readable medium stores therein instructions which, when executed by the at least one processor, cause the at least one processor to: receive, via a first graphical user interface (GUI) prior to the simulation, configuration data representing at least the following: (a) organizational nodes, (b) organizational pathways configured to interconnect the organizational nodes, (c) interorganizational relationships of the organizational nodes and the organizational pathways including product flow allocation through each of the organizational pathways, and (d) one or more first events configured to change one or more of the interorganizational relationships at predetermined times during the simulation; generate a framework of the simulation based on the configuration data; store, in the non-transitory computer-readable medium, the framework of the simulation until the simulation starts; receive, via a second GUI during a first period of time in the simulation, at least one user input configured to dynamically change the product flow allocation of at least one of the organizational pathways in response to at least one of the first events; determine one or more second events based on the at least one user input, wherein the second events are configured to dynamically change the one or more of the interorganizational relationships differently from the first events; and automatically update the one or more of the interorganizational relationships of the framework of the simulation in response to applying the second events in a second period of time following the first period of time.

In some examples, the instructions further cause the at least one processor to change availability of at least one of the organizational nodes and pathways based at least on both the first and second events. In some examples, the instructions further cause the at least one processor to generate the simulation framework by flexibly adjusting preexisting interorganizational relationships of a preexisting simulation framework to different interorganizational relationships based on the configuration data. In some examples, the instructions further cause the at least one processor to generate the simulation framework by flexibly adjusting preexisting organizational nodes and pathways to different preexisting organizational nodes and pathways based on the configuration data. the configuration data further represents messages configured to be displayed via the second GUI during the simulation, wherein the instructions further cause the at least one processor to: determine that the at least one user input fulfill a condition for at least one of the messages to be displayed; and transmit the at least one of the messages whose condition is fulfilled by the at least one user input to be displayed via the second GUI.

In some examples, the instructions further cause the at least one processor to: assign a player category to the second GUI and a message category to each of the messages; and transmit the messages to be displayed via the second GUI in response to determining that the player category assigned to the second GUI is the same as the message category assigned to the messages, wherein the at least one user input is received in response to the displayed messages. In some examples, the instructions further cause the at least one processor to facilitate communication during the simulation between a plurality of players in a same player category or between different player categories via the second GUI. In some examples, the instructions further cause the at least one processor to: receive, via the first GUI, node capacities of the organizational nodes and pathway capacities of the organizational pathways; and change the node or pathway capacities as determined based on both of the first and second events. In some examples, each of the organizational pathways defines a first directional flow between two of the organizational nodes, and the configuration data further represents counterflow pathways each defining a second directional flow opposing one of the first directional flows, wherein the instructions further cause the at least one processor to change the preliminary divisions or the second capacities of the organizational pathways during the simulation as determined based on the counterflow pathways.

In some examples, the instructions further cause the at least one processor to: identify, prior to the simulation, each of the organizational nodes as one of: a generation node or a destination node of a first flow simulation; and further identify at least one of the destination nodes of the first flow simulation as a generation node of a second flow simulation, wherein the second flow simulation subsequently follows the first flow simulation. In some examples, the instructions further cause the at least one processor to: generate instructions which, when executed by a processor of at least one electronic terminal, causes the processor of the at least one electronic terminal to display one of the first GUI or the second GUI; and transmit the instructions through a telecommunications network to be executed by the processor of the at least one electronic terminal via a web application. In some examples, the exercise is a simulated cyberattack on a flow network comprising the organizational nodes and pathways.

According to some embodiments, a non-transitory computer-readable medium stores therein instructions which, when executed by at least one processor, causes the processor to: receive, via a first graphical user interface (GUI), configuration data representing at least: (a) organizational nodes, (b) organizational pathways configured to interconnect the organizational nodes, (c) interorganizational relationships of the organizational nodes and the organizational pathways including product flow allocation through each of the organizational pathways, and (d) one or more first events configured to change one or more of the interorganizational relationships at predetermined times during the simulation; generate a framework of a computer-implemented simulation based on the configuration data; store, in the non-transitory computer-readable medium, the framework of the simulation until the simulation starts; receive, via a second GUI during a first period of time in the simulation, at least one user input configured to dynamically change the product flow allocation of at least one of the organizational pathways in response to at least one of the first events; determine one or more second events based on the at least one user input, wherein the second events are configured to dynamically change the one or more of the interorganizational relationships differently from the first events; and automatically update the one or more of the interorganizational relationships of the framework of the simulation in response to applying the second events in a second period of time following the first period of time.

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

The embodiments will be more readily understood in view of the following description when accompanied by the below figures and wherein like reference numerals represent like elements. These depicted embodiments are to be understood as illustrative of the disclosure and not as limiting in any way.

FIG. 3 shows a player GUI of a player terminal coupled with the computing device in the network of FIG. 1, according to the embodiments disclosed herein.

FIG. 4 shows an example of a simulation framework, according to the embodiments disclosed herein.

FIG. 5 shows a flowchart of a process implemented by the computing device integrated in the network to organize and conduct simulations of exercises, according to the embodiments disclosed herein.

Figure 1:
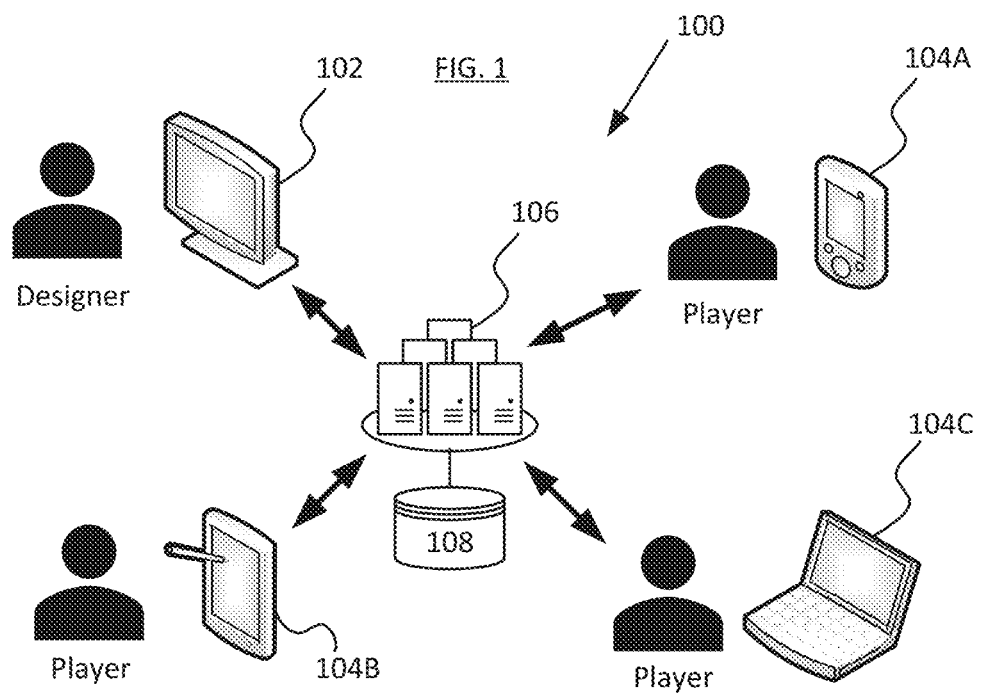
FIG. 1 shows a computing device integrated in a network of computing terminals for organizing and conducting simulations of exercises, according to the embodiments disclosed herein.

While the present disclosure is amenable to various modifications and alternative forms, specific embodiments have been shown by way of example in the drawings and are described in detail below. The intention, however, is not to limit the present disclosure to the particular embodiments described. On the contrary, the present disclosure is intended to cover all modifications, equivalents, and alternatives falling within the scope of the present disclosure as defined by the appended claims.

DETAILED DESCRIPTION OF THE DISCLOSURE

In the following detailed description, reference is made to the accompanying drawings which form a part hereof, and in which is shown by way of illustration specific embodiments in which the present disclosure is practiced. These embodiments are described in sufficient detail to enable those skilled in the art to practice the present disclosure, and it is to be understood that other embodiments can be utilized and that structural changes can be made without departing from the scope of the present disclosure. Therefore, the following detailed description is not to be taken in a limiting sense, and the scope of the present disclosure is defined by the appended claims and their equivalents.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments. Furthermore, the described features, structures, or characteristics of the subject matter described herein may be combined in any suitable manner in one or more embodiments.

FIG. 1 illustrates an example of a computing device 100, or computing system, for organizing and conducting a computer-implemented simulation to support an exercise, which may be a turn-based or scenario-based role-playing exercise in troubleshooting or problem-solving, as suitable. The device 100 is operatively coupled with a primary or configuration terminal 102 which is controlled by a designer (who is responsible for authoring and developing the scenario and incorporate it into the simulation exercise) to create or adjust the computer-implemented simulation and a secondary or player terminal 104 which is controlled by a player during the simulation to review the status of the simulation and make decisions on action to be implemented during the simulation as suitable. The example includes one configuration terminal 102 and three player terminals 104A, 104B, and 104C for three players, as shown, but it is to be understood that there may be any suitable number of primary and player terminals as suitable. Each terminal may be an electronic device capable of displaying a graphic user interface (GUI) that is specific to that terminal, such as a desktop or laptop computer, smartphone, television, tablet computer, personal digital assistant (PDA), gaming console, etc.

The device 100 includes a processor 106 and memory 108. The processor 106 may be any suitable means of processing data provided to and from the user via the GUI, including but not limited to a central processing unit (CPU) of a computing device, a virtual CPU of a virtual machine, a multicore CPU, a system on a chip (SoC), etc. The processor may be a programmable processing or microprocessing device of a solid-state, integrated circuit type that includes one or more processing units and memory. Processors can include one or more Arithmetic Logic Units (ALUs), CPUs, memory devices, and/or different circuitry or functional components, etc., as would occur to those skilled in the art to perform the desired implementations. The processor may be located remotely from the terminals and communicatively coupled therewith via any suitable means of digital communications including but not limited to the Internet, a cloud computing network, or a personal area network such as WLAN/WPAN connectivity, either via wired or wireless communications. In some examples, the processor 106 may be implemented in one of the terminals. In some examples, there may be a plurality of processors 106 which are functionally coupled together and therefore operate together. The terminals may also be located remotely from each other to allow the players to participate in the simulation from any convenient location.

The memory 108 may be any suitable means of non-transitory computer-readable storage medium which can be local, remote, or distributed. The memory may include, among others, random access memory (RAM), such as dynamic RAM (DRAM) and static RAM (SRAM), for example. The memory may also be a non-volatile storage such as a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The memory may also store software or computer program codes which, when executed by the processor, performs methods and algorithms to transmit GUIs to the terminals, receive user inputs from the terminals via the GUIs, and process the user inputs to determine the next GUIs to transmit to the terminals, as further disclosed herein.

Figure 2:
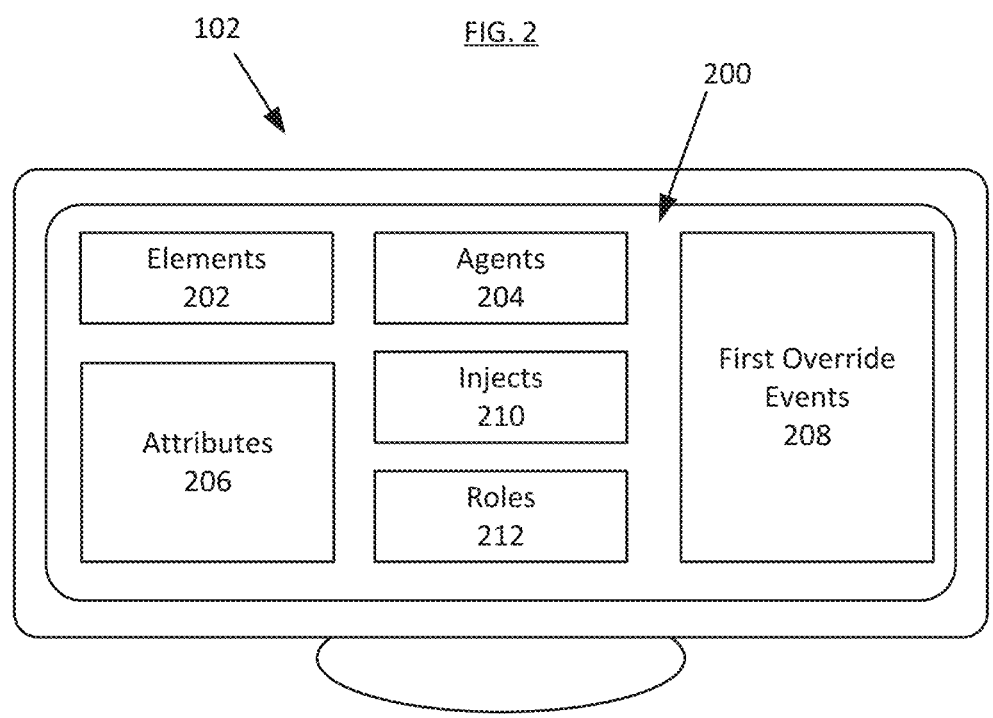
FIG. 2 shows a configuration GUI of a configuration terminal coupled with the computing device in the network of FIG. 1, according to the embodiments disclosed herein.

FIG. 2 shows an example of a configuration GUI 200 as displayed on a computer display of the configuration terminal 102. The computing device 100 transmits the GUI 200 to be displayed so as to provide the user, which in this case is the designer of the simulation, with information necessary to create or adjust the simulation as well as its details as further disclosed herein. The GUI 200 may be separated into different sections or windows to allow the designer to switch from one section or window to another. Each section or window, as shown, includes any suitable numbers and types of user input means, such as clickable buttons, data input windows, dropdown menus, and/or selectable tables, for example. Using the GUI 200, the user may input information regarding elements 202, agents 204, attributes 206, first or designer-implemented events 208, injects 210, and/or roles 212, among others. In some examples, the functional blocks shown are available to the designer, but they are not all simultaneously presented in a single GUI; that is, there may be separate GUIs for the designer to enter the different information as shown. The designer inputs configuration data via the GUI 200, where the configuration data represents at least the elements, agents, interorganizational relationships, and one or more first events, in order for the computing device 100 to generate a framework for the simulation based on the configuration data. In some examples, the memory 108 may store data of the framework for the simulation as well as the configuration data therefor, as determined via the configuration GUI 200, until the simulation starts. At the start of the simulation, the processor 106 uses the framework data and the configuration data stored in the memory 108 to initiate the simulation and to determine the player GUIs 300 to be displayed on the respective player terminals 104.

The term "element" as used herein describes an entity such as an institution or organization including but not limited to for-profit and non-profit organizations as well as any suitable type of business entities, governmental entities, and/or regulatory entities, for example, as further explained herein. Each element may be stationary and immobile in the sense that it is associated with a predetermined location. In some examples, an element may be referred to as a node or organizational node in a network or an origin or destination in a flow network, where the flow network may be associated with the flow of intangible products such as data and currency or tangible products such as oil, minerals, manufactured goods, or people, to name a few examples.

The term "agent" as used herein describes any suitable type entity, such as a business entity or entities, which provide any suitable means to interconnect two or more of the elements, or organizational nodes, as further explained herein. An agent may also be referred to as a pathway or organizational pathway of a network, where the agent may be capable of providing unidirectional or bidirectional product flow within the network or flow network. The agent may be stationary and immobile in the sense that it is associated with a predetermined location, or mobile in the sense that it includes a plurality of movable parts to form the product flows between two elements, such as from an origin to a destination. The agent may include any suitable means to facilitate flows of intangible products such as data and currency or tangible products such as oil, minerals, manufactured goods, or people, to name a few examples.

The term "interorganizational relationship" as used herein, also referred to herein as a topology of a system or network, defines how the organizations such as elements and the agents are interconnected with one another within the product flow network as well as the parameters associated with the product flow facilitated by the interconnected elements and agents. The interorganizational relationships may include the attributes of the product flows and the attributes concerning the elements and agents, as further explained herein. The interorganizational relationship may determine which agents may be associated with which elements in order to form the product flow to or from the elements. In some examples, the interorganizational relationships are flexible and dynamic such that the agent may be capable of connecting different pairs of elements at different times, or the element may be associated with different agents during the course of operation.

The term "attribute" as used herein, or more specifically a flow attribute, describes the specific metrics or units related to the product flow in the flow network, as further explained herein. In some examples, the flow attributes may define the absolute value of the product flow passing through each agent/element (i.e., how much of the product flow is allocated through each of the agents/elements), as well as the inherent factors associated with the agents/elements which may also be placed into consideration by the players during the simulation when making decisions to change certain flow attributes. For example, some of the inherent factors associated with the agents/elements may include capacity, availability, efficiency, cost/price, etc. The attributes determine the parameters of each agent such that different agents provide different types and qualities of services to facilitate the product flows. An attribute may also be considered as part of the interorganizational relationship due to the product flow being dependent upon the status such as capacity, availability, etc., of organizations such as the elements and the agents forming parts of the product flow network. In some examples, the computing device 100 may receive such attributes including but not limited to capacity, availability, efficiency, cost/price, etc. of the elements or agents via the configuration GUI, in response to which the attributes are changed by the computing device 100 and stored in the memory 108 to be referred to during the simulation.

The term "event" as used herein are any suitable events which occur during the simulation that are capable of causing damages or changes in the interorganizational relationships among the elements and the agents, as further explained herein. For example, the event may be capable of modifying product flow by affecting the attributes of certain agents, or modifying operation of certain elements. As used herein, such events may include natural disasters such as hurricanes, winter storms, forest fires, flooding, blackouts, etc., or manmade events such as cyberattacks, vandalism, terrorism, warfare, etc. The scale of the event may differ in different situations, as further explained herein.

The term "inject" as used herein is defined as the messages or events that are injected into the exercise during the simulation. The injects may include notifications of the events showing the effects of the events on the interorganizational relationships.

The term "role" as used herein is defined as a role in which each player or terminal is assigned to for the simulation. In some examples, each role may have certain limitations as to what actions the player in the role may take as well as what information may be provided to the player in the role, and the actions of different players in different roles may have different effects or consequences as determined.

The term "breakpoint" is defined as a period of in-game time during the simulation in which the players are able to provide inputs in response to the current situation.

The term "timestep" is defined as a period of in-game time between two consecutive breakpoints in which status of the simulation is updated. There may be multiple timesteps occurring between two breakpoints.

FIG. 3 shows an example of a player GUI 300 as displayed on a computer display of the player terminal 104. The GUI 300 includes a plurality of sections to serve different purposes. For example, a message section 302 of the GUI 300 may display messages to be shown to the player, including but not limited to the predetermined injects such as simulated emails or letters, as well as messages sent among the players participating in the same simulation for private or group discussions. For example, the messages may be transmitted from the computing device 100 and displayed on the player GUI 300 only in response to certain condition(s) being fulfilled, such as in response to a user input which fulfills a condition for such message to be displayed, in which case the message is an input-triggered event. Whether the message is triggered by user input or not may be determined during a timestep, for example. In some examples, a player category is assigned to the GUI 300, and a message category is assigned to each of the messages, such that the messages are transmitted from the computing device 100 to be displayed via the GUI 300 only in response to determining that the player category assigned to the GUI 300 is the same as the message category assigned to the messages, and at least one user input may be received in response to the displayed messages.

An update section 304 of the GUI 300 may display information (for example, updates on the simulated exercise, among other types of information as suitable) during a breakpoint, including but not limited to the updated status of the product flow, availability of the agents, storage capacity of the elements, etc., which may be beneficial for the players to determine their next course of action. Then, a decision section 306 of the GUI 300 may receive user inputs regarding the next course of action to take with respect to the simulated exercise. For example, the player may select from a list of available actions to take, or the player may input the action via the decision section 306. The decision section 306 may also be used for providing the player's responses to questions that are configured to ascertain the player's understanding of the scenario, in some examples. Thereafter, the user input is transmitted to the computing device 100 to be processed, after which the computing device 100 transmits the GUI 300, as updated according to the user input, during the next breakpoint. In some examples, the GUIs 200 and 300 are generated by the computing device 100 in a stand-alone software application, for example a computer program, whereas in some examples, the GUIs may be generated via a web application which generates and transmits the GUIs to be displayed on the displays of their respective terminals. The user input may or may not be requested at every breakpoint, and the player may opt out of providing user input in some of the breakpoints if thus inclined. In some examples, there is also an in-game clock and/or timer shown on the GUI 300 indicating the current in-game time and/or the remaining amount of time the player has in the breakpoint to make decisions. In some examples, the speed of the timer or the time limit may be adjusted according to the timeframe of the exercise.

FIG. 4 shows an example of a simulation framework 400 which may be generated based on the configuration data input by the designer via the configuration GUI 200. In the example, an origin 402 and a destination 406 are provided, as well as a plurality of agents 404, in this case three agents 404A, 404B, and 404C, each capable of connecting the two institutions 402 and 406 together. In this example, the first agent 404A is a train company, the second agent 404B is a bus company, and the third agent 404C is an airline, and the purpose of these agents is to transport a certain number of people from the origin 402 to the destination 406.

In this scenario, the origin 402 and the destination 406 are the elements, for example the airports and bus/train stations. The agents 404 define the different means of transportation (that is, commuter rail systems, bus companies, and airlines are all business organizations). The event may be a natural disaster which modifies the default or preexisting attributes related to one or more of the origin 402, the agents 404, and/or the destination 406 in response to which the allocation of passengers is redefined to accommodate movement of a group of people from the origin 402 to the destination 406, thus affecting the interorganizational relationship of each of the agents 404 with respect to the origin 402 and the destination 406. The attributes may include numerous factors such as the availability of the trains/buses/airplanes, the price of transporting people using these means of transportation, the time it takes for the means of transportation to complete each trip, etc.

FIG. 5 shows an example of a process 500 or method performed by the computing device 100 before and during the simulation. In step 502, the device receives configuration data from the designer via the configuration GUI. The configuration data, in some examples, includes the elements or organizational nodes, the agents or the organizational pathways, the interorganizational relationships which includes attributes, the product flow allocations for the organizational pathways, and the one or more first events configured to change one or more of the interorganizational relationships. The first events may be determined by a "master event sequence list" which provides the list of events that are determined by the designer to occur during different stages of the simulation. Based on the configuration data, the device generates a framework of the simulation in step 504. The device may determine the specific timing in which the first events are to occur during the simulation. The timing for such events may be predetermined by the designer, for example at specific in-game time, specific timesteps regardless of player actions, or conditional, for example in response to the players taking certain actions or making certain decisions as predetermined by the designer. In some examples, the designer may choose an in-game scenario time without concern to the timestep in which it occurs. Scenarios may also be laid out with timestep(s) selected to provide information updates at a desired rate. In step 506, the framework of the simulation is stored in the memory unit until the simulation starts. For example, the memory unit stores thereon the configuration data associated with the framework, and the configuration data may be altered, changed, or updated during the simulation, depending upon the user input(s), as further explained herein.

During the simulation, in at least one breakpoint thereof, the device receives one or more user inputs via the player GUI to dynamically change at least one of the allocations of product flow through the agents and/or elements in response to at least one of the first events, in step 508. One or more additional events are then determined based on the user inputs in step 510 during the breakpoint. These additional events are also referred to as "second events" to distinguish from the first events set forth by the designer in that the second events also affect the interorganizational relationships but are not predetermined by the designer before the simulation begins. Instead, only the user inputs determine the second events (that is, the second events are player-created/participant-created or caused by the actions of the players/participants during the simulation). In some examples, the second events may affect the interorganizational relationships differently from the first events. In some examples, the second event based on the player inputs may or may not be preceded by the first event. For example, the device may determine the second events such that the second events dynamically change the configuration data stored in the memory unit that represent one or more of the interorganizational relationships differently from the first events.

The device then automatically updates the interorganizational relationship(s) in response to the second events that take place during the breakpoint, in step 512, causing the status of the simulation to be updated. For example, the configuration data stored in the memory unit and representing the interorganizational relationships of the framework of the simulation, may be updated and stored in the memory unit in the same allocated location within the memory unit, or alternatively stored in a different location within the memory unit. In some examples, the second events dynamically affect the interorganizational relationship(s) with certain complexity such that the relationships among multiple elements and agents are affected by each of the second events. In some examples, a single second event may simultaneously affect multiple elements and agents in various degrees, and multiple second events may simultaneously or consecutively affect the same element or agent. In some examples, the effects of the multiple second events may accumulate or alternatively nullify each other depending upon the framework, which is then updated accordingly and stored in the memory unit. In some examples, the interorganizational relationship(s) is updated automatically in response to the current values of flow attributes as determined by scenario inputs and the first and second events. The updated status of the simulation may then be displayed via the player GUI. Specifically, the one or more of the interorganizational relationships of the framework of the simulation are updated in response to applying the second events in a second period of time following the first period of time. The updated interorganizational relationships (or the updated framework in general) may be stored in the memory unit as well for future access or reference. After this step, the simulation returns to step 508 where, after one or more timesteps, the device receives further user input(s) via the player GUI to dynamically change the product flow allocations in response to another one or more first events during a subsequent breakpoint. The cycle may continue until the end of the simulation. The simulation may end when the in-game time reaches a predetermined time, for example. In some examples, the device may perform step 512 instantaneously or near-instantaneously (for example, in less than 1 minute, less than 30 seconds, less than 10 seconds, or less than 1 second, or any other range of time therebetween, as suitable) so as to avoid participants or players from waiting a long period of time before the next breakpoint.

In some examples, the user inputs may be provided in response to additional or alternative events such as the second events created or caused by the player(s). For example, when there are multiple players participating in the simulation, the user input from a first player during a breakpoint may cause a second event in response to which a second player is to provide a second user input during the same breakpoint or in a subsequent breakpoint. As such, the user input from the first player may start a chain event of events affecting the product flow, and the other players may additionally provide user inputs to further change the product flow. This flexible and dynamic approach is advantageous in emulating the real-world situations of cause-and-effect in a larger scale, where the action of one party may cause long-lasting effects.

In some examples, the availability of at least one of the elements and agents may be changed or reduced based at least on both the first and second events. For example, a simulated natural disaster or cyberattack (first event) may render some of the elements and agents unusable, so other options must be considered. In some examples, the simulation framework is generated by flexibly adjusting preexisting interorganizational relationships of a preexisting simulation framework to different interorganizational relationships based on the configuration data, or by adjusting preexisting organizational nodes and pathways to different preexisting organizational nodes and pathways based on the configuration data, for example by adding, removing, editing, or relocating any of the elements or agents, or changing the attributes via the configuration GUI.

FIGS. 6 through 11 illustrate numerous nonlimiting examples of the topology of a flow network or a system of flow networks, as disclosed herein, provided for illustrative purposes only. The topology may be determined or developed by the designer using the configuration GUI 200, or may be predefined and flexibly adjustable by the designer via the GUI 200, such that the topology emulates the network of connections between the business entities or organizations in the sector.

Figure 6:
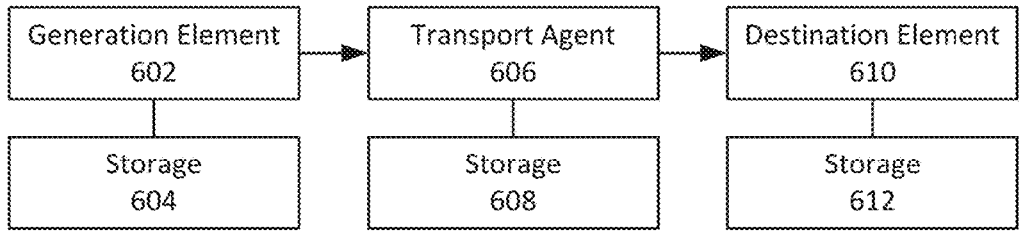
FIGS. 6 through 11 show different examples of a simulation framework, according to the embodiments disclosed herein.

FIG. 6 shows an example of a simulation framework 600 where storage capacity is assigned to each of the elements and agents. The elements in this example are referred to as a generation element 602 and a destination element 610, and the agent connecting the two elements 602 and 610 is referred to as a transport agent 606. Note that this is a simplified example and any suitable number of elements and agents may be involved. The framework 600 illustrates a primary product flow where the transport agent(s) 606 must account for the entire product flow from the generation element 602 to the destination element 610, and the agent 606 also has rules and times for passing the product flow. Storages 604, 608, and 612 are associated with the elements and agent, as shown, to account for the mismatch of product flow at each stage of product flow (that is, from the generation element 602 to the agent 606 and from the agent 606 to the destination element 610, or example). The flow attribute parameter, or the product flow allocation parameter, determines the amount of product flow assigned to each agent or element, for example. During simulation, in some examples, no element or agent may be permitted to receive more products than is permitted by the capacity of the storage associated therewith, or if an element or agent exceeds allowed storage, the excess is tracked. Depending on the type of product flow and the scenario requirements, this may be represented as a loan given or received, as a transfer of ownership, or even simply ignored, as suitable.

In some examples, the generation element 602 includes the organizations responsible for the production as well as the facilities used by these organizations to create and control the product flow. When there are multiple agents 606, each of these agents may have a differing time schedule for transporting the product and also may have different rules for the allowed amount or quality of the product, and the agents (either alone or in total) account for 100% of the product flow. The destination element 610 include receiving organizations or facilities that accept delivery of the product flow. In some examples, only the destination element 610 that is required for the scenario may be explicitly defined; the remaining flow may be assigned to be received by one or more additional entities such as additional destination elements. In some examples, they may be a default element that provides or receives some or all of the product flow that is not accounted for by the input-defined elements.

Figure 7:
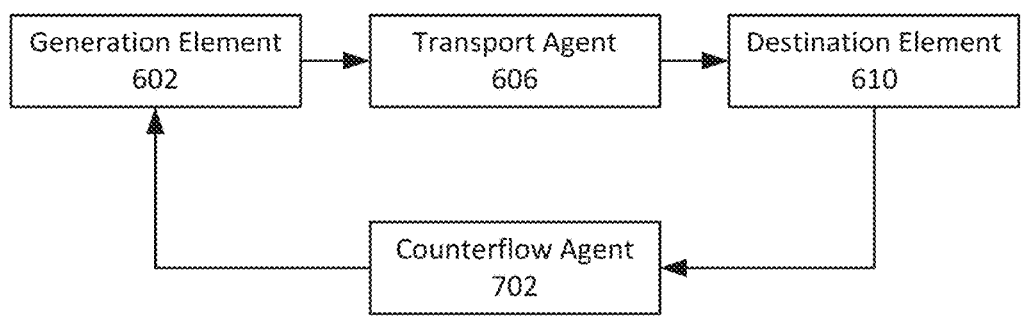

FIG. 7 shows an example of a simulation framework 700 which incorporates counterflow agent(s) 702 which flows in the direction opposite from the direction of product flow in the transport agent 606. In some examples, the counterflow agent 702 may represent the financial sector of the product flow, where banks and brokers facilitate the financial transaction from the destination element 610 (or a product-receiving organization, which may be referred to as a customer) to the generation element 602 (or a product-providing organization, which may be referred to as a seller). There may be a plurality of counterflow agents 702 such that portions of the total flow of financial transaction are handled by different agents, instead of relying entirely on a single agent. The computing device may be capable of changing the product flow allocations or the capacities of the agents as determined based on the counterflow agents 702, or more specifically the status of payment or other financial transaction.

Figure 8:
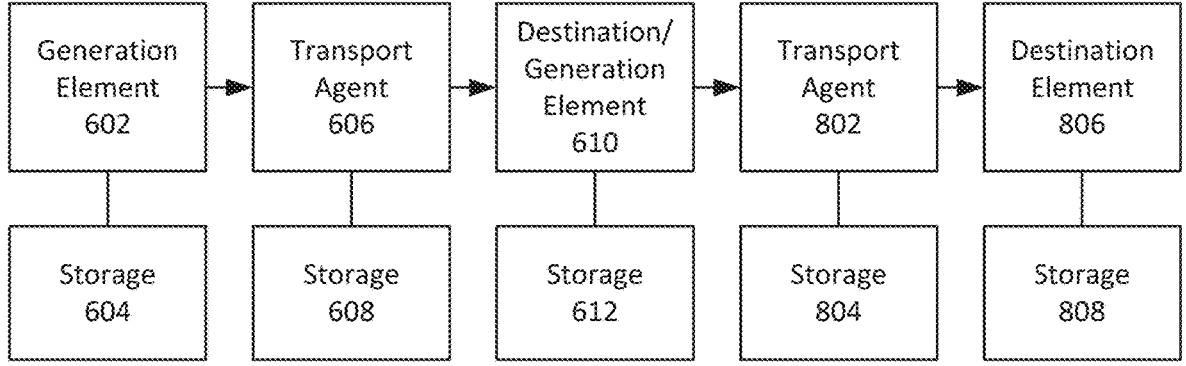

FIG. 8 shows an example of a simulation framework 800 which incorporates a chain of flow networks. That is, the element 610 is identified both as the destination element for a first product flow network (which includes the generation element 602, transport agent 606, and destination element 610) and the generation element for a second product flow network (which includes the generation element 610, transport agent 802, and destination element 806). The transport agent 802 and the destination element 806 also includes suitable storages 804 and 808, respectively, to accommodate for the product flow assigned to the agent and element. There may also be additional elements and agents following the destination element 806, as suitable, where each flow network may have the same structure or a different structure. In one example, this framework may be suitable in simulating the extraction and delivery of raw materials (first flow network), which may then be stored and transported in bulk at wholesale level (second flow network subsequently following the first flow network), after which the materials are provided to end users via retail delivery (third flow network subsequently following the second flow network).

In some examples, this three-level structure (that is, first through third flow networks) is common to many sectors, although the structure may be masked by vertical integration where a single corporate entity may control two or all three stages. In some sectors, there may be several three-stage chains, due to branching to accommodate multiple product transformations. Each of the three stages may each replicate the entities and the flows in the basic flow network structure, but may differ in some aspects. For example, the differences may be in the number of generation and destination elements, the timing of flow amounts during the day, and the organizations and formats that are active in the contracts, payment, and liquidity groups as previously mentioned, which may be associated with the different flow networks within the three-level structure.

Figure 9:
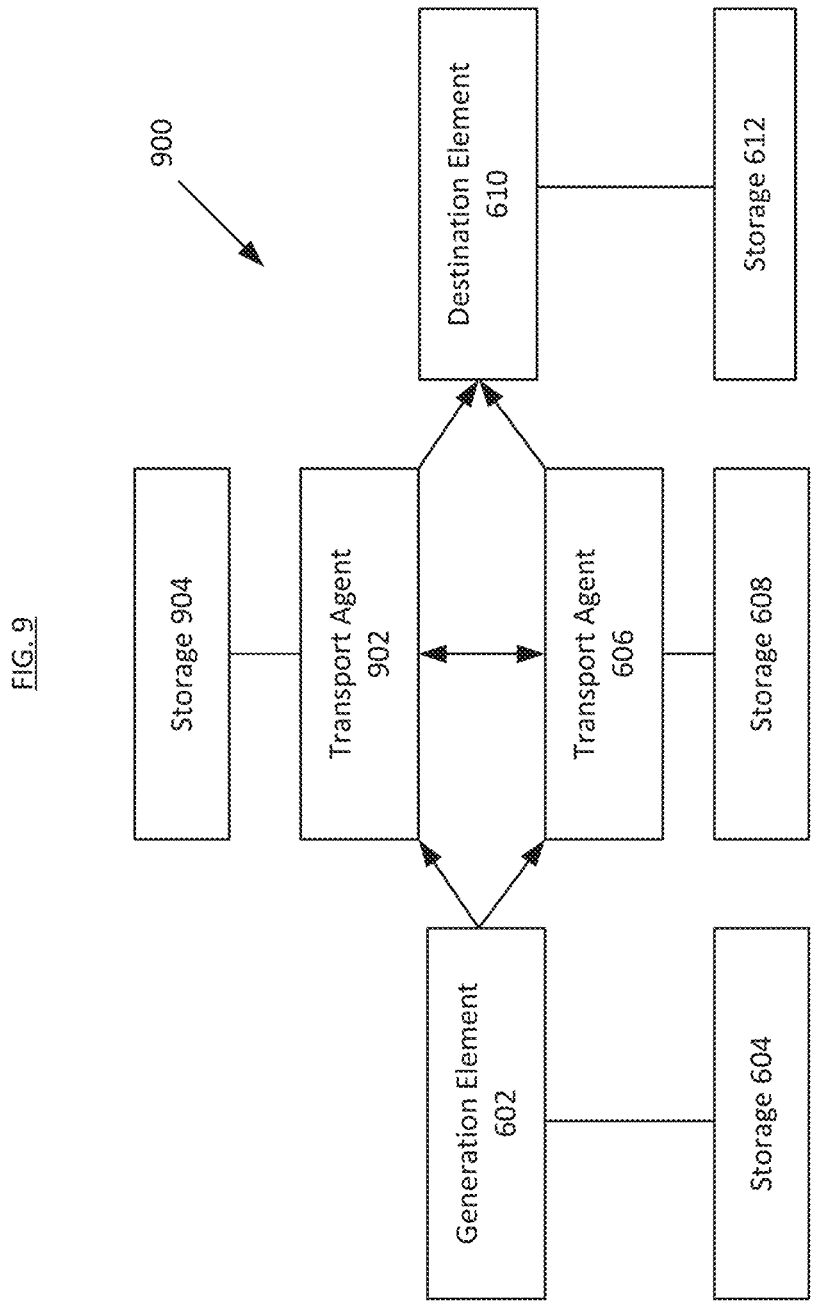

FIG. 9 shows an example of a simulation framework 900 which incorporates a plurality of transport agents 606 (with storage 608) and 902 (with storage 904) capable of transferring product between them. In one example, this framework may be used in simulating payment flows between banks, where the generation element 602 is a first bank sending the payment from a first account (storage 604) and the destination element 610 is a second bank receiving the payment for a second account (storage 612). The transport agents 606 and 902 may be different organizations or systems capable of sending payment from the first account to the second account. For example, the agent 606 may be the Clearing House Interbank Payments System (CHIPS) which is a private clearing house in the United States for large-value transactions, and the agent 902 may be the Federal Reserve of the United States, where the storage 608 represents the collateral at the CHIPS and the storage 904 represents the account balance at the Federal Reserve. The initial (or default) attributes of the agents may be predetermined accordingly, with the Federal Reserve and the CHIPS each having different attributes, such as the scale of the capacity which can be handled by the agent, the ability of making immediate payments or if there are delays involved in settling the transactions, as well as the technology involved in facilitating the transactions, among others.

Furthermore, in the example as shown, each of the bank-to-bank payment systems represented by the agents 606 and 902 includes a plurality of U.S. member banks (i.e., elements), each of which performs a fraction of the total payment transactions. As such, an agent is also understood to be able to include a plurality of elements in some examples, and each element within the agent may be capable of facilitating the product flow as assigned. In the example as shown, the flow percentage assigned to each member bank of the Federal Reserve may be determined by the percentage of market cap for each bank as divided by the total U.S. bank market cap, and the flow percentage assigned to each member bank of the CHIPS may be greater than the flow values for those in the Federal Reserve, for example about 50% greater. Some of the member banks may also be able to selectably perform payment transactions via the first payment method via CHIPS or the second payment method via the Federal Reserve, while other member banks can only perform payment transactions via one method (e.g., only via the Federal Reserve because such banks are not members of the CHIPS, in which case the flow percentage via the CHIPS for such banks is 0%).

Figure 10:
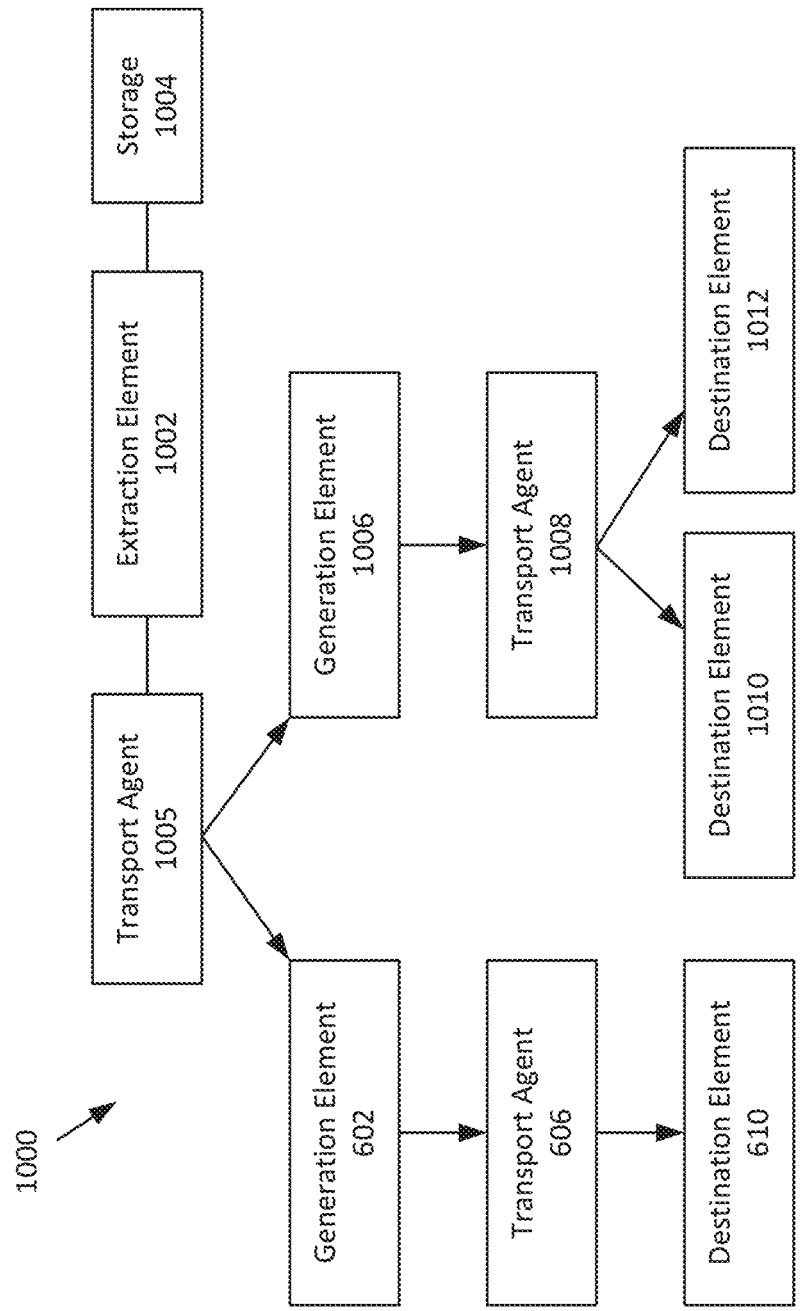

FIG. 10 shows an example of a simulation framework 1000 which incorporates extraction element 1002 providing product to a plurality of different generation elements 602 and 1006 to be transported and distributed. For example, the framework 1000 may apply to an oil-gas chain of flows, where the extraction element 1002 represents oil and gas wells and the storage 1004 represents the terminals temporarily storing the extracted oil and gas. A transport agent 1005 facilitates transporting the product (oil and gas) from the respective wells or storage to the suitable generation element 602 or 1006 for the product. The generation elements 602 and 1006 represent the natural gas pipelines from the processors to underground storage as well as crude oil pipelines from the basin to refineries, both of which are independently operated to transfer the respective product (oil or gas) to the destination. Although not explicitly shown, it is to be understood that each of the agents and elements may include any suitable storage means, as discussed herein.

The transport agents 606 and 1008 represent the natural gas pipelines from the underground storage to the local distribution terminals (for gas) as well as pipelines, trucks, and rails from the refineries to local distributers (for oil). In some examples, there may be a plurality of pipeline operators but only a single pipeline, in which case there is only a single agent responsible for the product flow, thereby having no allocation of product flow among multiple agents. The destination element 610 represents the natural gas distribution pipelines (for gas) whereas there may be multiple different destination elements 1010 and 1012 for oil, such as the different local distributors which have their own means of distribution that are separate and independent from each other, such as distributors for jet fuel, gasoline, and distillate fuels such as heating oil and diesel, for example, and the distribution may be geographically dependent. The attributes may be the amount of flow by volume, price per unit volume, and the computed monetary value of the product.

Figure 11:
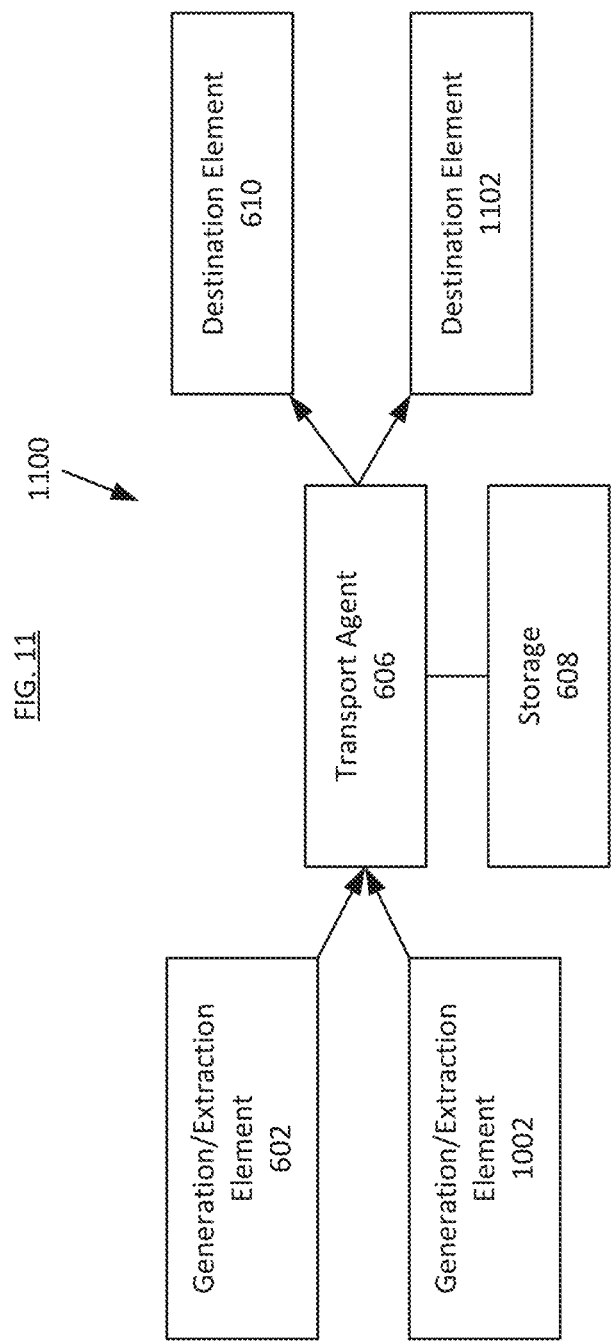

FIG. 11 shows an example of a simulation network 1100 which is a variation of the oil and gas well extraction flow network. The multiple generation or extraction elements 602 (for crude oil) and 1002 (for natural gas) are all connected to the transport agent 606 which represents the crude oil and natural gas gathering pipelines. In some examples, the network includes a saltwater disposal system coupled with the generation/extraction element 1002 where the crude oil and salt water are separated in a settling tank, and the water is transported to a salt water disposal. The crude oil and natural gas are then distributed separately to the destination element 610 (which represents the distribution terminals for the crude oil) and to a destination element 1102 (which represents the processors for the natural gas). In some examples, the destination element 610 further includes off-airport terminals, heating oil distributors, diesel fuel terminals, and gasoline terminals, among others. In some examples, the transport agent 606 may also include trains and trucks in addition to the pipelines.

The flow of the product (oil and gas) throughout the network may be monitored using Supervisory Control and Data Acquisition (SCADA) system. SCADA is a computer-based system for gathering and analyzing real-time data to monitor and control equipment that deals with critical and time-sensitive materials or events, and in the examples as shown, the SCADA sensors and controllers are dispersed throughout the system, such as coupled to each of the elements and agents, in order to monitor and control equipment pertaining to the product flow. There may be a plurality of such devices coupled to one element or agent for increased accuracy or as backup in case one of the devices fails to operate. In events such as cyberattacks, the SCADA sensors and controllers may be the likely target of attack, such that if one or more of the elements or agents are rendered incapable of facilitating product flow, the players must decide which of the other elements or agents must be used to facilitate the product flow instead.

In this regard, the sensors and controllers of SCADA may be implemented in the system similar to FIG. 7, where the generation element 602 represents a system sector of the network which may include a processor(s) and memory which stores the status of the system, the transport agent 606 represents the SCADA monitoring devices such as sensors. Although technically not a product flow but a data flow, in such examples, the destination element 610 represents an operations control sector which may include a processor(s) and memory which receives the sensor information and determines a control output. The counterflow agent 702 (thereby forming a feedback loop) represents a SCADA controlling device(s) such as controllers which receive the control output and control the status of the system accordingly. It is to be understood that there may be multiple SCADA devices, and one or more of the devices may be capable of both sensing and controlling the status of the product flow.

Figure 12:
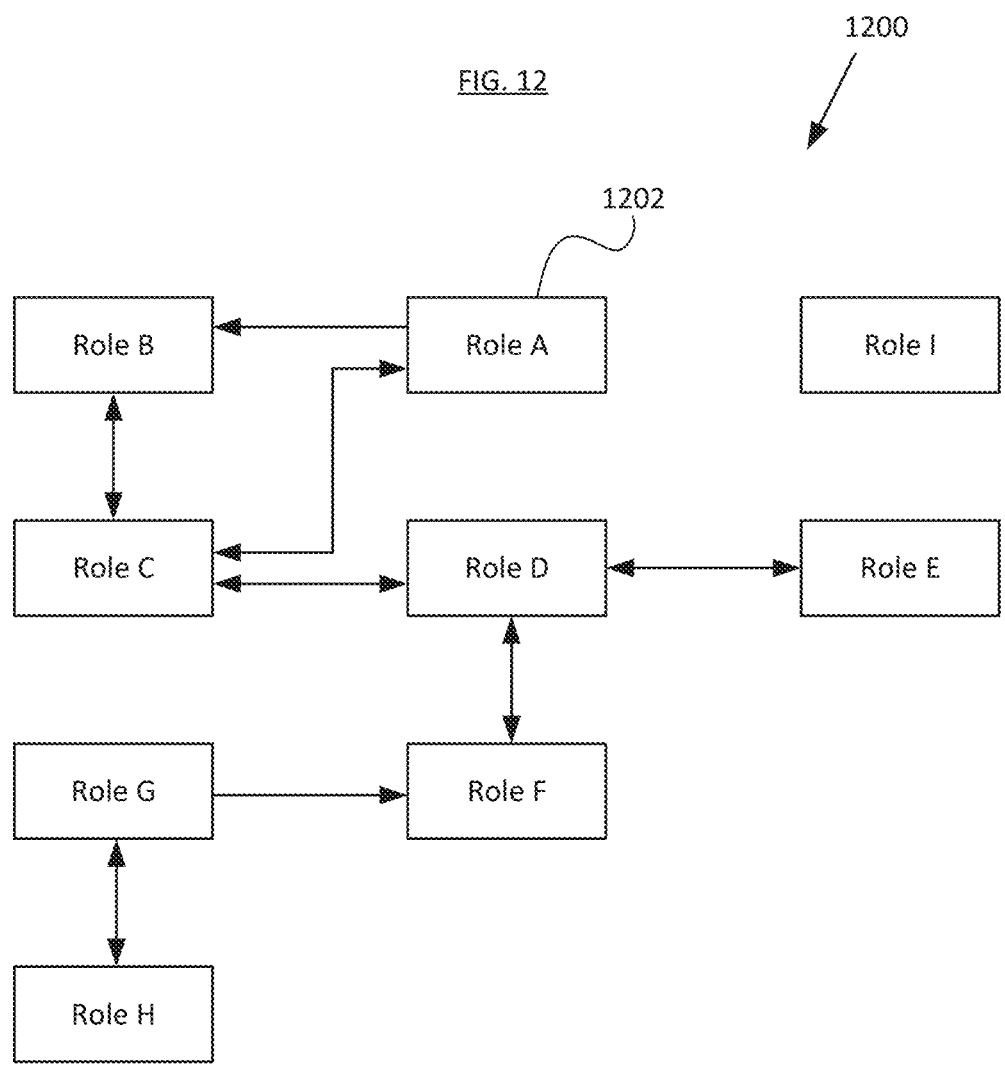
FIG. 12 shows an example of an organizational structure within an organization (for example, element or agent), according to the embodiments disclosed herein.

FIG. 12 shows an example of an organizational structure 1200 of any one of the elements or agents, as suitable. As previously explained, the configuration GUI 200 allows the designer of the simulation to associate certain players with one of the predetermined roles 212 within an organization, in order to emulate the communications that different members or employees of the organization facilitate in order to make a decision as a group in response to an event. Communication may be facilitated between players of different roles or categories, or between players of the same role or category. There may be any suitable number of groups 1202, such as those labeled from A through I, where players in each role may be limited as to with which of the other roles they can communicate, as well as whether or not the communication may be unidirectional or bidirectional.

For example, role A may be a management role where the players are the executives of the organization, and they may only facilitate unidirectional communication with role B, which may be the public relations role, to give instructions. However, role A may facilitate bidirectional communication with role C, which is an investor relations role with an incident response team who provides status information of the incident and incident response to the role A. In this regard, role D may be an operations role with control room operators, role E may be a systems role responsible for monitoring and controlling the system, role F may be an accounting role responsible for the billing and payments, role G may be a contracts role with contracting officers, and role G may be a legal role with a team of lawyers. Role I may be the information technology role responsible for computers and networks communications, whose players are capable of communicating with any of the preceding roles. In some examples, under the instructions from the management (group A), role I may be able to take the systems offline to perform system analysis, for example. As this example is for illustrative purposes only, there may be more or less roles than, or different roles with different roles and responsibilities from, those as shown. The number and types of roles may be determined as suitable for the simulation by the designer via the configuration GUI 200.

Described below are an exemplary relationship between the different sectors of a business entity or organization.

The "management" role A receives reports from all functional roles and monitors performance against expectations. The amounts of incoming and delivered flow are scheduled by role A to conform to contract obligations or market opportunities. Role A also schedules the operation of individual flow systems for load balancing, planned maintenance, or in response to equipment failures.

The "systems" role E receives product flow from an external source and provide product flow to an external receiver. Role E connects a destination element in a first flow network to a generation element in a second flow network to include some processes that transform the product. Role E may have product storage facilities to accommodate a mismatch between the flow received and the flow delivered. If the flow system includes a transformation, a separate storage may be included for the product both before and after the transformation.

The "operations" role D is the central hub which controls one or more systems roles E and provides information and coordinates efforts for other functional roles in the organization. Role D receives inputs that represent the status of role E at each stage, controls the rate of transformation, and directs incoming flow to storage or transformation and from transformation to storage or external delivery in accordance with schedules of flow provided by role A. Role D reports the incoming and delivered product flows to the "accounting" role F to update accounts payable and accounts receivable. Both roles D and F have external links to suppliers and customers; role D has the external links for coordination of product flows, and role F has the external links for billing and payment flows. Suppliers and customers also have a link to the "contracts" role G and the "legal" role H, both directly for negotiations or executing contracts.

The "public relations" role B functions under role A that monitors news and social media for references to the business entity, and transmits messages prepared or approved by role A to the necessary channels for informing shareholders, employees, vendors, customers, and the general public. The flow of information about the business entity is a separate additional flow in the model, for example.

The "information technology" role I of the business entity maintains and operates all computers and networks used in each of the functions shown above. Role I is responsible for maintaining network and computer firewalls and intrusion monitoring, and for taking action to isolate and neutralize malware that is detected. As directed by role A, role I may take the systems offline, and when role E is remote from role D, role I is responsible for the SCADA systems that provide monitoring and control of remote product flows. The control and monitoring signals are another non-product flow that may be included in the simulation model. Communications, both internal and external, is a flow that includes web interfaces, email, text messaging, and audio and video telephony.

The "incident response" role C is activated, for example, when a cyber-attack, or its effect, is recognized. Role C may have a team leader who is authorized to fill all or part of the role of role A in responding to a casualty and provides a link to role A. The team leader is supported by team members from each functional area, either in a dedicated role or at least by immediate communications links.

Figure 13:
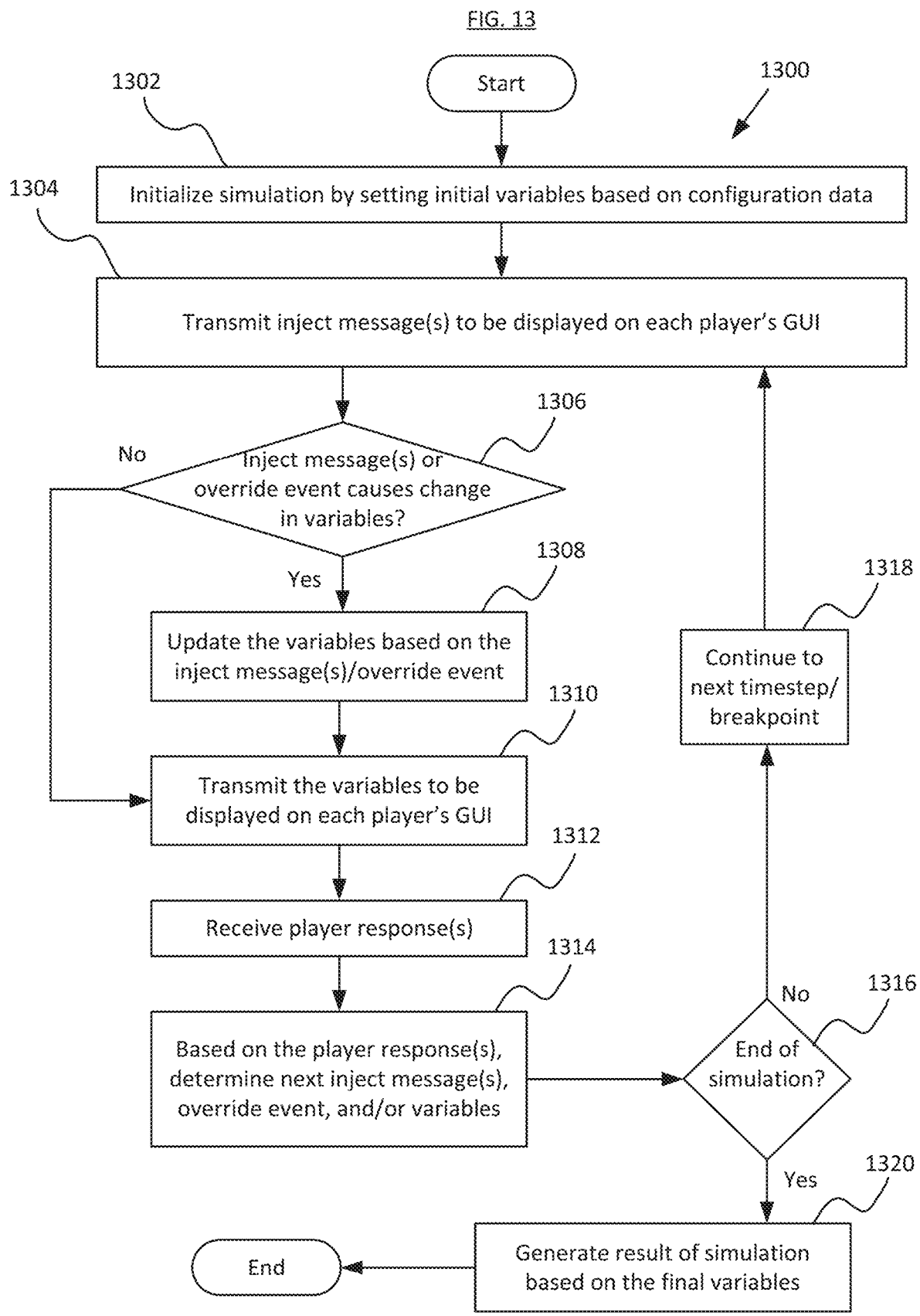
FIG. 13 shows a flowchart of a process implemented by the computing device integrated in the network to conduct simulations of exercises, according to the embodiments disclosed herein.

FIG. 13 shows a general flow 1300 of performing the simulation using the computing device 100 and the terminal(s) 104 after the framework of the simulation (with the elements and agents interconnected in a flow network) as well as the parameters are determined and/or adjusted by the designer via the configuration GUI 200. In step 1302, the computing device 100 initializes the simulation by setting the initial variables based on the configuration data provided by the designer. The initial variables may include any of the parameters of the elements, the agents, and the attributes.

In step 1304, the computing device transmits the inject message(s) at the beginning of a timestep or a breakpoint, as suitable, to be displayed on each player's GUI. The computing device determines whether the inject message(s) and/or the first event(s) causes change in the initial variables, in step 1306. If the initial variables are changed, in step 1308, the variables are updated accordingly based on the inject message(s) and/or the first event(s), after which the updated variables (e.g., the flow attributes over time that result from the current attribute values as determined by the scenario input and as modified by first and second events) are transmitted to be displayed on each player's GUI in step 1310. If there are no changes in the initial variables, the process skips over step 1308 and proceeds to transmit the variables, unchanged, to be displayed on the GUI according to step 1310.

The player or players then provide the player input(s) via the player GUI in response to the displayed information, where the input(s) or response(s) is received by the computing device in step 1312. Thereafter, based on the player input(s) or response(s), the computing device determines the next inject message(s), second event, and/or variables in step 1314. This step may also include the computing device calculating or determining the specific parameters associated with the second event based on the player input(s) or response(s), where the second event is a player-caused event, and the parameters may include the changes in the interorganizational relationships of the product flow network.

In step 1316, the computing device determines whether the simulation has reached the end of simulation, which may be determined manually by a person such as a moderator for the simulation (for example a controller determines that the exercise objectives have been achieved or that players' choices/decisions have altered the conditions so greatly that no useful training can be accomplished by continuing), or automatically by determining if the in-game time of the simulation has reached a preset time as initially set by the designer. In some examples, whether the simulation is to end depends on whether the players have achieved a predetermined goal or set of goals, such as achieving certain parameters including but not limited to meeting or exceeding a threshold of the amount of product reaching the destination element(s), among other factors determining the successful completion of the simulation. In some examples, the end of simulation may be determined by the players' failing to meet certain thresholds, thereby concluding the simulation for failure of the players to minimum product flow, for example.

If the computing device determines that the end of simulation has not been reached, in step 1318, the simulation proceeds or continues to the next timestep or breakpoint, as suitable, thereby repeating step 1314 with different inject message(s) from the previous timestep/breakpoint, and/or with the updated variables caused by the previous player input(s) or response(s), for example. Otherwise, if the computing device determines that the end of simulation has been reached, in step 1320, the computing device generates a result of the simulation based on the final variables as set or updated in the final timestep/breakpoint of the simulation. The result may be summarized and output via the player GUI such that the players may analyze how well they performed in the simulation.

In some examples, the timesteps are internal to the simulation and is generally a rather short time (for example, 1 minute, 15 minutes, 1 hour, or any other suitable time therebetween) that provides sufficient granularity for representing normal time-dependent changes in the product flow through the system. During a breakpoint in the exercise, the simulation is paused while players assess conditions and make responses. The system clock may also be paused or slowed down (that is, delaying the beginning of a subsequent timestep) to allow the players more time to decide the next actions to take.

As disclosed herein, the configuration GUI allows for much greater flexibility in the number of exercises, the number of participant organizations (agents and elements), and the number of roles that can be implemented in the simulation. The simulation software also supports extensive reuse of inputs between exercises and promotes efficiency at each stage of the exercise life cycle; that is, a previously designed framework may be adjusted or revised via the configuration GUI to accommodate the new exercise. Furthermore, in some examples, the configuration GUI also provides improvements by expanding the scope of potential scenarios by enabling a chain of product flow networks, and in some cases also a data flow network, across one or more sectors, instead of being limited to a single product flow network as known in the art.

In some examples, the configuration GUI may display the simulation framework in real-time in the form of graphical representation of the framework on the display of the terminal. The configuration GUI may also facilitate drag-and-drop feature to allow the designer to move or relocate the individual components shown on the display, for example the elements and/or agents, with respect to each other in order to alter the interorganizational relationships or topology of the framework. In some examples, the attributes of the individual components may be superimposed on the displayed components when the designer selects the component or a mouse cursor hovers over it temporarily. In some examples, the configuration GUI may automatically adjust the positions of the individual components in response to detecting the designer moving the icon(s) of the component(s) on display, or in response to determining the hierarchical relationship of the individual components with respect to each other. The sizes of the icons displayed may also be automatically adjusted based on the number of the icons being displayed.

It is to be understood that persons of ordinary skill in the art will readily appreciate that methods and apparatus for simulating flow of product in a sector and all related supporting flows. Specifically, the simulation software system disclosed herein may use a secure distributed model wherein each business entity or organization in the sector receives and generates a specified portion of the total flows in the sector and is able to control its systems to modify each of the individual flows in response to normal and casualty conditions, and the actions of other business entities or organizations.

The foregoing description has been presented for the purposes of illustration and description. It is not intended to be exhaustive or to limit the invention to the example embodiments disclosed. Other modifications and variations are possible in light of the above teachings. It is intended that the scope of the invention be limited not by this detailed description of examples, but rather by the claims appended hereto.

The present subject matter may be embodied in other specific forms without departing from the scope of the present disclosure. The described embodiments are to be considered in all respects only as illustrative and not restrictive. Those skilled in the art will recognize that other implementations consistent with the disclosed embodiments are possible. The above detailed description and the examples described therein have been presented for the purposes of illustration and description only and not for limitation. For example, the operations described can be done in any suitable manner. The methods can be performed in any suitable order while still providing the described operation and results. It is therefore contemplated that the present embodiments cover any and all modifications, variations, or equivalents that fall within the scope of the basic underlying principles disclosed above and claimed herein. Furthermore, while the above description describes hardware in the form of a processor executing code, hardware in the form of a state machine, or dedicated logic capable of producing the same effect, other structures are also contemplated.

What is claimed is:

1. A method of organizing and conducting a computer-implemented simulation to support an exercise, the method comprising:
   receiving, by at least one processor via a first graphical user interface (GUI) prior to the simulation, configuration data representing at least:
   a) organizational nodes,
   b) organizational pathways configured to interconnect the organizational nodes,
   c) interorganizational relationships of the organizational nodes and the organizational pathways including product flow allocation associated with a flow of product through each of the organizational pathways,
   d) one or more first events configured to change one or more of the interorganizational relationships at predetermined times during the simulation,
   e) node capacities of the organizational nodes and pathway capacities of the organizational pathways, wherein each of the organizational pathways defines a first directional flow of the product between two of the organizational nodes, and
   f) counterflow pathways each defining a second directional flow opposing one of the first directional flows, wherein the counterflow pathways facilitate one or more financial transactions associated with the first directional flow of the product;
   generating, by the at least one processor, a framework of the simulation based on the configuration data;
   storing, by a memory unit, the framework of the simulation until the simulation starts;
   receiving, by the at least one processor via a second GUI during a first period of time in the simulation, at least one user input configured to dynamically change the product flow allocation of at least one of the organizational pathways in response to at least one of the first events;
   determining, by the at least one processor, one or more second events based on the at least one user input, wherein the second events are configured to dynamically change the one or more of the interorganizational relationships differently from the first events;
   changing, by the at least one processor, the node or pathway capacities as determined based on both of the first and second events;
   changing, by the at least one processor, one or more of: the product flow allocation, at least one preliminary division, or at least one second capacity of the organizational pathways, as determined based on the counterflow pathways; and
   automatically updating, by the at least one processor, one or more of the interorganizational relationships of the framework of the simulation in response to applying the second events in a second period of time following the first period of time.

2. The method of claim 1, further comprising:
   changing, by the at least one processor, availability of at least one of the organizational nodes and pathways based at least on both the first and second events.

3. The method of claim 1, wherein generating the simulation framework comprises flexibly adjusting, by the at least one processor, preexisting interorganizational relationships of a preexisting simulation framework to different interorganizational relationships based on the configuration data.

4. The method of claim 1, wherein generating the simulation framework comprises flexibly adjusting, by the at least one processor, preexisting organizational nodes and pathways to different preexisting organizational nodes and pathways based on the configuration data.

5. The method of claim 1, wherein the configuration data further represents messages configured to be displayed via the second GUI during the simulation, the method further comprising:
 determining, by the at least one processor, that at least one user input fulfill a condition for at least one of the messages to be displayed; and
 transmitting, by the at least one processor, at least one of the messages whose condition is fulfilled by at least one user input to be displayed via the second GUI.

6. The method of claim 5, further comprising:
 assigning, by the at least one processor, a player category to the second GUI and a message category to each of the messages; and
 transmitting, by the at least one processor, the messages to be displayed via the second GUI in response to determining that the player category assigned to the second GUI is the same as the message category assigned to the messages, wherein the at least one user input is received in response to the displayed messages.

7. The method of claim 6, further comprising:
 facilitating, by the at least one processor during the simulation, communication between a plurality of players in a same player category or between different player categories via the second GUI.

8. The method of claim 1, further comprising:
 identifying, by the at least one processor prior to the simulation, each of the organizational nodes as one of:
  a generation node or a destination node of a first flow simulation; and
 further identifying, by the at least one processor, at least one of the destination nodes of the first flow simulation as a generation node of a second flow simulation, wherein the second flow simulation subsequently follows the first flow simulation.

9. The method of claim 1, further comprising:
 generating, by the at least one processor, instructions which, when executed by a processor of at least one electronic terminal, causes the processor of the at least one electronic terminal to display one of the first GUI or the second GUI; and
 transmitting, by the at least one processor through a telecommunications network, the instructions to be executed by the processor of the at least one electronic terminal via a web application.

10. The method of claim 1, wherein the exercise is a simulated cyberattack on a flow network comprising the organizational nodes and pathways.

11. A computing device for organizing and conducting a computer-implemented simulation to support an exercise, the device comprising: at least one processor, and a non-transitory computer-readable medium storing therein instructions which, when executed by the at least one processor, cause the at least one processor to:
 receive, via a first graphical user interface (GUI) prior to the simulation, configuration data representing at least:
  a) organizational nodes,
  b) organizational pathways configured to interconnect the organizational nodes,
  c) interorganizational relationships of the organizational nodes and the organizational pathways including product flow allocation associated with a flow of product through each of the organizational pathways,
  d) one or more first events configured to change one or more of the interorganizational relationships at predetermined times during the simulation,
  e) node capacities of the organizational nodes and pathway capacities of the organizational pathways, wherein each of the organizational pathways defines a first directional flow of the product between two of the organizational nodes, and
  f) counterflow pathways each defining a second directional flow opposing one of the first directional flows, wherein the counterflow pathways facilitate one or more financial transactions associated with the first directional flow of the product;
 generate a framework of the simulation based on the configuration data;
 store, in the non-transitory computer-readable medium, the framework of the simulation until the simulation starts;
 receive, via a second GUI during a first period of time in the simulation, at least one user input configured to dynamically change the product flow allocation of at least one of the organizational pathways in response to at least one of the first events;
 determine one or more second events based on the at least one user input, wherein the second events are configured to dynamically change the one or more of the interorganizational relationships differently from the first events;
 change the node or pathway capacities as determined based on both of the first and second events;
 change one or more of: the product flow allocation, at least one preliminary division, or at least one second capacity of the organizational pathways, as determined based on the counterflow pathways; and
 automatically update the one or more of the interorganizational relationships of the framework of the simulation in response to applying the second events in a second period of time following the first period of time.

12. The device of claim 11, wherein the instructions further cause the at least one processor to change availability of at least one of the organizational nodes and pathways based at least on both the first and second events.

13. The device of claim 11, wherein the instructions further cause the at least one processor to generate the simulation framework by flexibly adjusting preexisting interorganizational relationships of a preexisting simulation framework to different interorganizational relationships based on the configuration data.

14. The device of claim 11, wherein the instructions further cause the at least one processor to generate the simulation framework by flexibly adjusting preexisting organizational nodes and pathways to different preexisting organizational nodes and pathways based on the configuration data.

15. The device of claim 11, wherein the configuration data further represents messages configured to be displayed via the second GUI during the simulation, wherein the instructions further cause the at least one processor to:
 determine that the at least one user input fulfill a condition for at least one of the messages to be displayed; and transmit the at least one of the messages whose condition is fulfilled by the at least one user input to be displayed via the second GUI.

16. The device of claim 15, wherein the instructions further cause the at least one processor to:

assign a player category to the second GUI and a message category to each of the messages; and transmit the messages to be displayed via the second GUI in response to determining that the player category assigned to the second GUI is the same as the message category assigned to the messages, wherein the at least one user input is received in response to the displayed messages.

17. The device of claim 16, wherein the instructions further cause the at least one processor to:

facilitate communication during the simulation between a plurality of players in a same player category or between different player categories via the second GUI.

18. The device of claim 11, wherein the instructions further cause the at least one processor to:

identify, prior to the simulation, each of the organizational nodes as one of: a generation node or a destination node of a first flow simulation; and further identify at least one of the destination nodes of the first flow simulation as a generation node of a second flow simulation, wherein the second flow simulation subsequently follows the first flow simulation.

19. The device of claim 11, wherein the instructions further cause the at least one processor to:

generate instructions which, when executed by a processor of at least one electronic terminal, causes the processor of the at least one electronic terminal to display one of the first GUI or the second GUI; and transmit the instructions through a telecommunications network to be executed by the processor of the at least one electronic terminal via a web application.

20. The device of claim 11, wherein the exercise is a simulated cyberattack on a flow network comprising the organizational nodes and pathways.

21. A non-transitory computer-readable medium storing therein instructions which, when executed by at least one processor, cause the at least one processor to:

receive, via a first graphical user interface (GUI), configuration data representing at least:
a) organizational nodes,
b) organizational pathways configured to interconnect the organizational nodes,
c) interorganizational relationships of the organizational nodes and the organizational pathways including product flow allocation associated with a flow of product through each of the organizational pathways,
d) one or more first events configured to change one or more of the interorganizational relationships at predetermined times during the simulation,
e) node capacities of the organizational nodes and pathway capacities of the organizational pathways, wherein each of the organizational pathways defines a first directional flow of the product between two of the organizational nodes, and
f) counterflow pathways each defining a second directional flow opposing one of the first directional flows, wherein the counterflow pathways facilitate one or more financial transactions associated with the first directional flow of the product;

generate a framework of a computer-implemented simulation based on the configuration data;

store, in the non-transitory computer-readable medium, the framework of the simulation until the simulation starts;

receive, via a second GUI during a first period of time in the simulation, at least one user input configured to dynamically change the product flow allocation of at least one of the organizational pathways in response to at least one of the first events;

determine one or more second events based on the at least one user input, wherein the second events are configured to dynamically change the one or more of the interorganizational relationships differently from the first events;

change the node or pathway capacities as determined based on both of the first and second events;

change one or more of: the product flow allocation, at least one preliminary division, or at least one second capacity of the organizational pathways, as determined based on the counterflow pathways; and automatically update the one or more of the interorganizational relationships of the framework of the simulation in response to applying the second events in a second period of time following the first period of time.

* * * * *